(12) United States Patent  
McCutchen

(10) Patent No.: US 6,317,166 B1
(45) Date of Patent: Nov. 13, 2001

(54) SYNCHRONIZATION FRAME GENERATOR FOR MULTICHANNEL IMAGING SYSTEM

(75) Inventor: David McCutchen, Portland, OR (US)

(73) Assignee: Immersive Media Company, Portland, OR (US)

( * ) Notice: Subject to any disclaimer, the term of this patent is extended or adjusted under 35 U.S.C. 154(b) by 0 days.

(21) Appl. No.: 09/145,310

(22) Filed: Aug. 31, 1998

(51) Int. Cl.[7] .................................................. H04N 5/222
(52) U.S. Cl. ........................... 348/722; 348/521; 348/36; 348/218; 348/262
(58) Field of Search ............................... 348/36, 38, 159, 348/705, 262, 722, 578, 383, 218, 500, 521

(56) References Cited

U.S. PATENT DOCUMENTS

| | | | |
|---|---|---|---|
| 4,231,063 | * 10/1980 | Ito et al. | 348/159 |
| 4,467,365 | * 8/1984 | Murayama et al. | 348/262 |
| 4,994,916 | * 2/1991 | Pshtissky et al. | 348/159 |
| 5,019,905 | * 5/1991 | Pshtissky et al. | 348/159 |
| 5,142,367 | * 8/1992 | Houg | 348/159 |
| 5,347,322 | * 9/1994 | Levine et al. | 348/718 |
| 5,495,293 | * 2/1996 | Ishida | 348/500 |

* cited by examiner

*Primary Examiner*—Victor R. Kostak

(57) ABSTRACT

A special synchronization frame generator is used for creating simultaneous easily visible synchronization markers as part of a multi-channel image generating system. It does not rely upon any external objects or markers being simultaneously present in the field of view of several cameras in a multi-camera system, or upon a separate synchonization signal being recorded simultaneously along with the image information, or upon any post-processing of the recorded image to add synchronization markings common to the various channels of the system. The generation of synchronization frames can be applied to either multichannel video or film systems. In a video system, a single genlock generator is used to create a common time base for the several channels of the system, such as multiple video cameras, and a single synchronization frame generator, when triggered by a relay controlled by an operator, is used to substitute a fixed signal level simultaneously in a given frame for all channels in the system, thereby replacing any image information present. A simple detection circuit can be used to detect these unique synchronization frames during playback of any recording made from the system. Added frames before or after the synchronization frame can be used to carry identifying information related to a particular track. This synchronization frame generator is particularly suitable for compound camera systems used for panoramic imaging.

12 Claims, 2 Drawing Sheets

McCutchen - Synchronization Frame Generator for Multichannel Imaging System

McCutchen - Synchronization Frame Generator for Multichannel Imaging System

SYNCHRONIZATION FRAME GENERATOR FOR MULTICHANNEL IMAGING SYSTEM

BACKGROUND—FIELD OF THE INVENTION

This invention relates to the field of signal synchronization methods and panoramic television devices.

DESCRIPTION OF THE PRIOR ART

In audio-visual recording systems, it is often necessary to synchronize several streams of audio or visual images. Multiple cameras are often used for recording a scene simultaneously from several points of view, while at the same time one or more audio devices record the sound.

All of these streams of information must be synchronized to each other in the playback process. For multiple-camera systems, one or more of three synchronization methods are commonly used:

1. A visual cue simultaneously recorded on several media. One example of this is a clapboard, which gives simultaneous marking of a visual cue (the camera seeing the clapper coming together) and an audio cue (the sound of the clap being recorded on an audio track). This would work for multiple-camera shoots only if all of the cameras could clearly and simultaneously see the clapboard coming together. This same principle is embodied in a more convenient form for multiple-camera shoots by a device which flashes a bright light (for the camera) while emitting a sharp sound (for the audio). If any camera cannot clearly record the visual cue, then it cannot be synchronized with the others.
2. A separate synchronization signal is recorded simultaneously on all media. One example of this is SMPTE time code, which can be recorded on multiple film, video or audio devices, and which provides a common time reference for the numbering of individual frames. By making use of this information, all of the frames or audio recorded at a given time can be aligned to one another. This requires separate devices for reading and interpreting the synchronization signal information.
3. Physically marking visual cues on the media itself after recording is completed. For example, multiple strips of motion picture film are often used in the process of editing and when producing multi-layer effects. Audio recordings are also present in the form of mag track recordings with the same perforations as film. In a multi-gang synchronizer on an editing bench, these strips of film can be placed next to each other on linked spoked wheels, and markings made, either with grease pencil, permanent marker or by punching holes in the middle of the frame, to mark key synchronization frames common to all. By lining up these marked frames, synchronization can be achieved. Physical marking requires extra steps in the postproduction process, and is impractical for electronic media such as video where changes in the video image typically require a recopying process and the risk of loss of visual image quality.

Other approaches in the patent literature have relied upon variations in these approaches. For example, U.S. Pat. No. 4363055 "Control System for Audio Visual Projector" describes a separate control signal representing frame numbers. U.S. Pat. No. 5481307 "Method and Apparatus for Compression and Decompression Sequences of Digital Video Images Using Synchronization Frames" involves arbitrary marking of selected frames after recording for special handling in a compression process. A similar process is found in Motion Picture Experts Group Level 2 (MPEG-2) compression, where Intra (I) frames are identified and used for comparison to measure the changes in a moving video image.

The synchronization of multiple cameras usually involves making sure that all share the same frame rate. Otherwise, they will drift apart over time. Another step is to make sure that all frames begin and end together. Otherwise, if one frame ends during the exposure time for another, there is the possibility for a sync marker at a given moment in time extending over one frame on one track, and two frames on another track. For enforcing a common frame rate for film-based systems, a synchronization pulse controlling the camera motors is often used. For setting a frame rate for multiple video cameras, a single "genlock" signal is fed into all of the cameras, such as a "video black" signal.

OBJECTS AND ADVANTAGES OF THE INVENTION

The present invention comprises an improvement in marking synchronization points as part of a recording and playback apparatus for multi-channel imaging systems. This improvement generates an easily visible synchronization frame simultaneously for all channels, and can be applied to either video or motion-picture film-based systems. It does not rely upon any external objects or markers being simultaneously present in the field of view of any camera in the multi-camera system. It also does not rely upon a separate synchronization signal being recorded simultaneously along with the video images, or upon any marking or post-processing of the recorded image or the image media.

LISTED PARTS IN DRAWINGS

Figure 1:
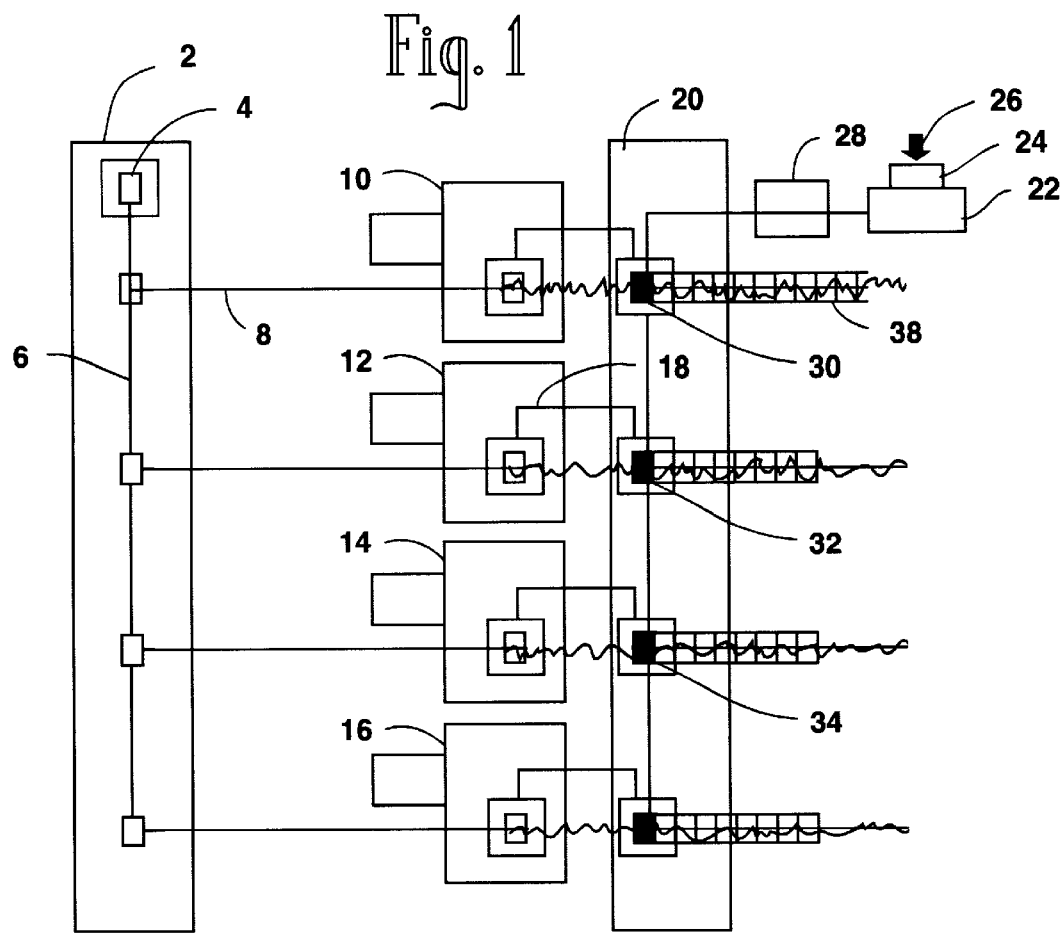
FIG. 1 is a block diagram of the signal flow of a multi-channel video camera system including a simultaneous synchronization frame generator.

2 Video Timing signal generator
4 Video Frame generator
6 Video timing and frame generation signal
8 Example of video signal stream
10–16 Video Cameras A–D
18 Internal video signal with image information included
20 Sync Frame Generator
22 Frame frame interface
24 Sync Frame Trigger
26 Substitute signal generator
28 Action of operator
30 Sync Frame as recorded in Track A
32 Sync Frame as recorded in Track B
34 Sync Frame as recorded in Track C
36 Sync Frame as recorded in Track D 38 Video Output
40 Sequence of frames for Track A
42 Sequence of frames for Track B
44 Sequence of frames for Track C
46 Sequence of frames for Track D
48 Sample Sync Frame
50 Extra Information frame—Track A
52 Extra Information frame—Track D
54 Example of Video Frame in Track
56 Frames being reproduced from a playback device
58 Direction of travel
60 Signal reader
62 Signal from reader
64 Frame Start detect
66 Detector for sync frame signal level
68 Frame End detect
70 Flag for detection of sync frame

DETAILED DESCRIPTION OF THE INVENTION

A synchronization frame circuit will be described particularly suited for the generation of an easily readable mark on all channels of a multi-channel video system. The same principle could also be applied to multi-channel film cameras or other multi-image recording systems. The use of a sync frame generator is particularly suitable for highly-integrated compound video camera systems used for panoramic imaging, such as the Dodeca™ 1000 Round About™ Immersive Video Camera System.

The principle of the present invention relies upon the substitution of a blank frame for the usual ever-changing image signal produced by an image generator such as a motion picture film or video camera. This blank frame is generated simultaneously in all of the channels of the system, regardless of what the camera image of an individual channel might be at that moment.

FIG.1 shows a block diagram of the signal flow of a multi-channel video camera system including a simultaneous synchronization frame generator. A video timing generator 2 includes a timing circuit for generation of frame divisions within the video stream, typically in the form of vertical sync pulses, in addition to any necessary color burst pulses, horizontal sync signals and other components of a typical video signal, according in National Television Standards Committee (NTSC) video, or another standard such as PAL or SECAM. The video frame generator component 4 is here shown simultaneously distributed along line 6 into four channels A–D of regular frame divisions, such as at 8. For purposes of clarity here, the genlock frame generator timeline, the video image generator signal, and the position of the sync frame are shown spread out horizontally, even though they are essentially contemporaneous. An unlimited number of channels can be included in the described system.

This "genlock" signal is thereby fed into multiple video image generators, such as the video cameras A–D shown here as 10, 12, 14, and 16, respectively. Here the frame and other timing information from the genlock signal serves as the basis for outputting the image information coming from a sensor such as a Charge-Coupled Device (CCD) or a Complementary Metal Oxide Semiconductor (CMOS) imager. In place of the usual visible-light video images, other sensors or electronics are sometimes used to output different image information as part of a video signal, such as infrared, ultraviolet, or amplified night vision images. The video signal information goes out on a line such as at 18.

The synchronization frame generator 20 is controlled by a relay 22, which is activated by an interactive trigger device 24 such as a positive-action pushbutton, which an operator can trigger 26 when a sync point is to be recorded. When the button is pushed, a substitute signal generator 28 sends a fixed-level signal to be output as part of the video stream instead of the image information from the camera on line 18. The substituted sync frame being generated is identical for all channels. The sync frame as output on tracks A–D is shown at 30, 32, 34, and 36, respectively. At 38 is an example of regular nonsync frame video output.

Figure 2:
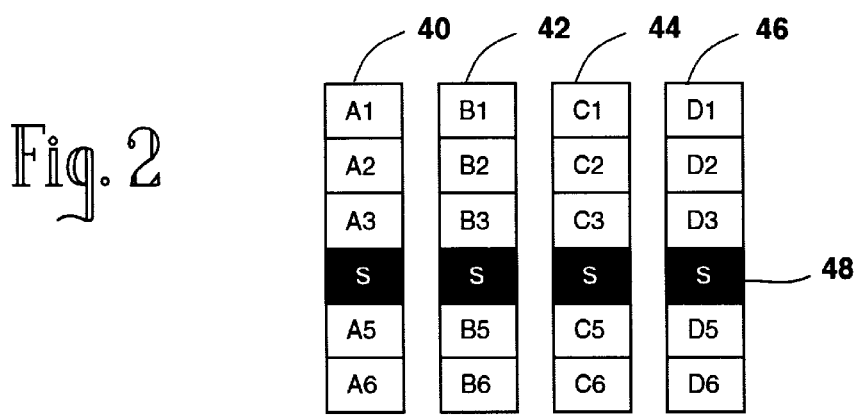
FIG. 2 is a schematic view of multiple strips of frames, showing the synchronization frames simultaneously generated at the same moment in time for each.

FIG. 2 is a schematic view of multiple strips of frames, showing the synchronization frames simultaneously generated at the same moment in time for each. A sequence of frames for Track A is at 40, a sequence of frames for Track B is at 42, a sequence of frames for Track C is at 44, and a sequence of frames for Track D is at 46, with all frames shown numbered consecutively according to a given moment in time. A sample of a substituted sync frame is at 4 8. These frames can be either film frames or video frames.

There are several options for the appearance of this sync frame. In a film-based system, the sync frame can be black, as caused by an override circuit preventing the shutter from opening for that frame on all cameras synchronized to the system by the usual means of a frame rate control signal for the camera motor. For mechanical shutters linked to the camera motor, an additional sync-frame shutter must be added to perform this function. Marking the otherwise unexposed sync frame can be done, either within the gate at the same time, or at a later point in time within the camera, with a small light such as from a Light-Emitting Diode (LED), either shining alone or through a mask to create a pattern. Care must of course be taken to prevent this light from exposing any part of any other film in the camera. An easily visible and distinctive sync frame pattern on the developed film will simplify the task of recognizing a sync frame as opposed to a normally unexposed frame.

In a video-based system, the sync frame should be as much of a visible contrast to the usual form of the video image signal. In that way, it will be visible to someone reviewing the recording even when it is going by at the full speed of 60 fields/30 frames per second (in NTSC) or in a fast-forward or fast-reverse review mode. If only one field of an interlaced video sequence is marked, then it may not be visible to an operator during normal playback.

A video sync frame should be solid in appearance (as a contrast to the multifareous detail in a typical picture) and be either black, a color, grey, or a form of white. For an NTSC black frame, the signal level (in the frame area usually occupied by the video image information) can be either the usual "video black" level of 7.5 IRE units, or preferably a "super black" of 0 IRE. A "super black" sync frame, because it has a different signal from that normally produced by a video camera, is more apt to be recognized by a simple signal detection device for detecting sync frames during review of any recordings made.

If the sync frame is to be a color, it should be a bright color, such as a solid frame of red, green or blue. If the sync frame is grey, with an IRE level for example of 50, it may be visibly different, but could be missed in a fast review of the image because it has less contrast with normal video images. However, a grey frame, since it is more within the IRE parameters of "normal" video image reproduction, may be easier in certain cases to reproduce accurately. White frames can be of several IRE levels. The usual peak white of video recording is 100 IRE. If the generated sync frame is at that level, it could be confused with a normal video image such as a camera pointed at a bright light. It is better to generate the white at an obviously artificial "super white" level, such as 120 to 130 IRE. However, levels above IRE 120 can sometimes cause interference in adjacent audio channels.

Figure 3:
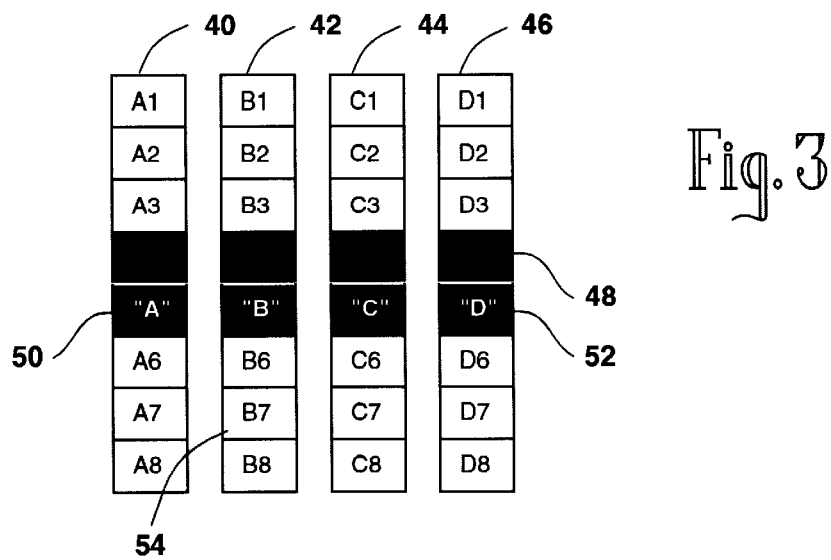
FIG. 3 is a schematic view of multiple strips of frames, showing the synchronization frames simultaneously generated at the same moment in time for each with the addition of a stream-identification frame following the synchronization frame.

In addition to a generated sync frame for all channels, a second frame can be added to carry identification information about the particular track. Such a "slate frame" can have simple information such as a letter identifier of the track, or complex information about the time reference, name of the production, and other data. FIG. 3 is a schematic view of multiple strips of video frames, showing the synchronization frames simultaneously generated at the same moment in time for each with the addition of a stream-identification slate frame following the synchronization frame. An extra Information frame for Track A is shown at 50, and for Track D at 52. At 54 is an example of a numbered video frame in the track. The slate frame is here shown following the sync frame, although it could also be placed ahead of it. However, if it is placed after the sync frame, it is more suitable for a simple detection circuit that could be set up to recognize the sync frame first as a preparation to the recording of the track information in an automated fashion.

Figure 4:
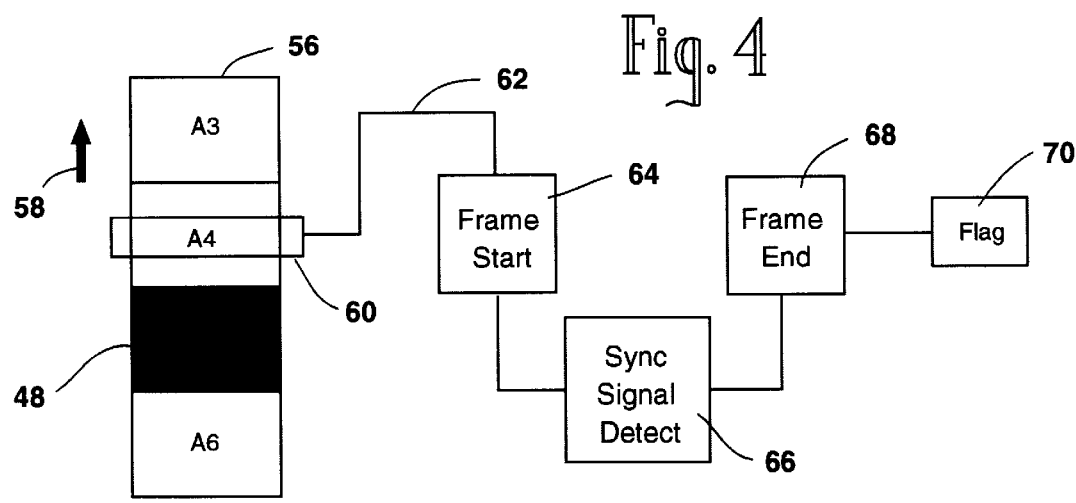
FIG. 4 is a block diagram of a reader circuit for automatically detecting and reacting to sync frames as part of a postproduction logging and editing process.

FIG. 4 is a block diagram of a reader circuit for automatically detecting and reacting to sync frames as part of a postproduction logging and editing process. The frames being reproduced from a playback device are shown at 56, with the direction of travel shown at 58. At 60 is a signal reader, such as for extracting the information usually representing the various details making up a video image. The signal 62 from the reader goes first to a detector 64 for the vertical pulse and other components marking the start of a video frame or field. After this is detected, the signal is sent to a detector for the sync frame signal level at 66. One characteristic of the sync frame signal level is that it does not vary, because the frame is blank. If there is variation in the signal, as normally happens when recording a picture, then the detector resets and waits for the next frame. If the signal matches the assigned level for a sync frame (such as IRE 0, within allowable limits for noise) throughout the frame, then when the end of the frame is detected at 68, a flag is set at 70 for the detection of the sync frame. At that point, a command could be sent to stop and park the recording machine on the sync frame, or perform some other automated playback function such as the recording of slate frame information as described above, or the recording of SMPTE time code data that is present on another track or elsewhere in the video signal, such as that represented by Vertical Interval Time Code (VITC).

A detector for sync frames in a film-based system could rely on the detection of a black frame in an otherwise continuous motion sequence, such as where the frame image before and after the sync frame is mostly identical (as is true for almost every sequence except for that in rapid motion). If extra marking of the sync film frame has been done with an LED array, then the detector can be designed to recognize only that pattern, and ignore any black frames that could normally be produced by the camera when starting and stopping scenes.

Although the description above contains many specificities, these should not be construed as limiting the scope of the invention but as merely providing illustrations of some of the presently preferred embodiments of this invention. For example, a sync frame can have an appearance of a simple graphic pattern such as blocks or stripes, rather than a solid frame. A sync frame can also be generated on a single field of an interlaced video signal. The color of the sync frame can be programmed to change in a sequence, to aid in the identification of a particular marked frame by a reader circuit.

Thus the scope of the invention should be determined by the appended claims and their legal equivalents, rather than by the examples given.

I claim:

1. An apparatus for generating a synchronization frame in a multi-channel video system, comprising:
   (a) video frame generation means coupled to a plurality of video image channels, for simultaneously generating regular frame divisions in said plurality of video image channels,
   (b) video image generation means for each of said plurality of video image channels, each capable of generating a video image signal comprised of varying signal levels between said video frame divisions,
   (c) synchronization frame generating means coupled to said video frame generation means and said video image generation means for each of said plurality of video image channels, said synchronization frame generating means comprising an image substitution circuit coupled to a relay, wherein closure of said relay causes said image substitution circuit to output a fixed-level signal to each of said plurality of video image channels in place of the video image signal produced by any one of video image generation means, during a period of time defined by said video frame generation means,
   (d) recording means for said video channels,
   (e) playback means compatible with said recording means, for playing back recordings made of of said video channels.

2. The apparatus of claim 1, wherein said period of time is equal to one of said regular frame divisions.

3. The apparatus of claim 1, wherein said video image generation means comprise a video image sensor coupled to a lens.

4. The apparatus of claim 1, wherein said period of time is equal to two of said regular frame divisions, and said image substitution circuit is arranged to substitute a fixed-level signal during one of said frame divisions, and a separate visual identifying signal for each of said video channels during the other frame division.

5. The apparatus of claim 1, wherein said fixed-level signal measures approximately 7.5 IRE units, thereby creating a "video black" image.

6. The apparatus of claim 1, wherein said fixed-level signal measures approximately 0 IRE units, thereby creating a "super black" image.

7. The apparatus of claim 1, wherein said fixed-level signal measures approximately 120 to 130 IRE units, thereby creating a "video super-white" image.

8. The apparatus of claim 1, with the addition of playback means coupled to said recording means, wherein said playback means include a detection circuit for said fixed-level signal in at least one of said video channels, and flagging means coupled to said detection means for indicating the presence of a synchronization frame.

9. An apparatus for generating a synchronization frame in a multi-channel motion picture film system, comprising:
   (a) frame rate means coupled to the drive motors in a plurality of motion picture film cameras, for simultaneously generating a synchronized regular frame rate in said plurality of motion picture film cameras through the synchronization of said motors, (b) image generation means within each of said plurality of motion picture film cameras, comprising motion picture film and a shutter mechanism for exposing said motion picture film to light coming through a lens and a camera gate, (c) synchronization frame generating means coupled to said frame rate means and said image generation means for each of said plurality of motion picture film cameras, said synchronization frame generating means comprising an addition to said shutter mechanism, preventing exposure of a single frame in each of said plurality of motion picture film cameras, (d) a trigger relay controlled by an operator, for triggering the operation of said synchronization frame generating means at will, (e) playback means for the examination of individual strips of said motion picture film after development.

10. The apparatus of claim 9, wherein said period of time is equal to two of said regular frame divisions, and said image substitution circuit is arranged to substitute a fixed-level signal during one of said frame divisions, and a separate visual identifying signal for each of said video channels during the other frame division.

11. The apparatus of claim 9, with the addition of detection means for identification of synchronization frames among sequences of normally-exposure motion picture film images, and flagging means coupled to said detection means for indicating the presence of a synchronization frame.

12. The apparatus of claim 9, with the addition of a light-emitting diode to said addition to said shutter mechanism, arranged in a manner to mark with a fixed light pattern said synchronization frame otherwise prevented from being exposed by said addition to said shutter mechanism.

* * * * *